United States Patent [19]

Strack et al.

[11] Patent Number: 5,681,645
[45] Date of Patent: Oct. 28, 1997

[54] FLAT ELASTOMERIC NONWOVEN LAMINATES

[75] Inventors: David Craige Strack, Canton; Jay Sheldon Shultz, Roswell; Linda Jeanette Morgan, Dunwoody, all of Ga.

[73] Assignee: Kimberly-Clark Corporation, Neenah, Wis.

[21] Appl. No.: 456,842

[22] Filed: Jun. 1, 1995

Related U.S. Application Data

[63] Continuation-in-part of Ser. No. 191,825, Feb. 3, 1994, abandoned, which is a continuation of Ser. No. 502,098, Mar. 30, 1990, abandoned.

[51] Int. Cl.$^6$ .................... B32B 5/08; B32B 5/26; B32B 7/14; B32B 25/04
[52] U.S. Cl. .......... 428/196; 128/849; 128/888; 128/206.18; 128/206.19; 128/206.28; 128/207.13; 156/291; 428/197; 428/198; 442/24; 442/25; 442/26; 442/255; 442/283; 442/318; 442/319; 602/42; 602/44; 602/48; 604/308; 604/392
[58] Field of Search ............... 156/291; 428/196, 428/197, 198, 236, 246, 255; 128/849, 888, 206.18, 206.19, 206.28, 207.13; 602/42, 44, 48; 604/308, 392

[56] References Cited

U.S. PATENT DOCUMENTS

| | | | |
|---|---|---|---|
| 4,663,220 | 5/1987 | Wisneski | 428/221 |
| 4,699,621 | 10/1987 | Stevens | 604/387 |
| 4,701,170 | 10/1987 | Wilson | 604/387 |
| 4,707,398 | 11/1987 | Boggs | 428/224 |
| 4,720,415 | 1/1988 | Vander Wielen | 428/152 |
| 4,724,184 | 2/1988 | Killian | 428/230 |
| 4,741,949 | 5/1988 | Morman | 428/224 |
| 4,756,709 | 7/1988 | Stevens | 604/396 |
| 4,801,482 | 1/1989 | Goggans | 428/198 |
| 4,803,117 | 2/1989 | Daponte | 428/228 |
| 4,879,170 | 11/1989 | Radwanski | 428/23 |
| 4,908,263 | 3/1990 | Reed | 428/286 |
| 4,929,492 | 5/1990 | Carey | 428/198 |
| 5,221,572 | 6/1993 | Meunier | 428/231 |
| 5,268,212 | 12/1993 | Lumb | 428/96 |
| 5,304,599 | 4/1994 | Himes | 525/98 |
| 5,332,613 | 7/1994 | Taylor | 428/198 |
| 5,336,545 | 8/1994 | Morman | 428/198 |
| 5,354,604 | 10/1994 | Blakeman | 428/246 |
| 5,385,775 | 1/1995 | Wright | 428/286 |
| 5,393,599 | 2/1995 | Quantrille | 428/198 |
| 5,403,123 | 4/1995 | Walters | 428/230 |
| 5,418,044 | 5/1995 | Mahler | 428/196 |
| 5,425,987 | 6/1995 | Shawyer | 428/198 |

*Primary Examiner*—James C. Cannon
*Attorney, Agent, or Firm*—James B. Robinson; Karl V. Sidor

[57] ABSTRACT

There is provided a laminate material having stretchability and recovery, breathability and barrier properties, and being made from a nonwoven elastomeric web having at least one web of textile material discontinuously adhesively bonded to each side thereof. The laminate material is free of an elastomeric film, the elastomeric web is substantially flat when the laminate is unstretched, and the nonwoven elastomeric web provides recovery to the laminate. The nonwoven elastomeric web is preferably a web of meltblown elastomeric fibers and the other webs may be knits, wovens or scrim materials. These laminates are well suited for infection control products, personal care products and garments.

18 Claims, 1 Drawing Sheet

FLAT ELASTOMERIC NONWOVEN LAMINATES

This application is a continuation in part of pending application Ser. No. 08/191,825 entitled FLAT LAMINATIONS OF TEXTILES AND NONWOVEN ELASTOMERIC WEBS which was filed in the U.S. Patent and Trademark Office on Feb. 3, 1994, now abandoned and which was a continuation of application Ser. No. 07/502,098, now abandoned, entitled FLAT LAMINATIONS OF TEXTILES AND NONWOVEN ELASTOMERIC WEBS which was filed in the U.S. Patent and Trademark Office on Mar. 30, 1990.

BACKGROUND OF THE INVENTION

The present invention is concerned with a laminate material having stretch and recovery, a method of making such laminate material and articles made therefrom. More particularly, the present invention is directed to a laminate material of (1) a first web of, for example, a knit, woven, or scrim material, i.e., a textile material, together with (2) a second web of a nonwoven elastomeric material and (3) a third web of, for example, a knit, woven, or scrim material, i.e., a textile material, to provide a laminate with stretch and recovery; a method of making such laminate, and articles made therefrom.

Various textile materials, such as knits and woven materials, can be stretched, but have relatively poor recovery, that is, do not recover their original size and shape after stretching. Since there is not much retraction force in the recovery, these fabrics tend to lose their original size and shape.

It has been desired to provide a textile material which is not only stretchable, but also has recovery characteristics. It is also desired to achieve such material which is stretchable and has recovery characteristics, as well as having other properties such as breathability, puncture resistance, etc., which permit the material to be used for making garments, infection control products and personal care products. It is further desired to provide such material, having stretch and recovery characteristics, wherein in the unstretched state the material is not puckered, that is, does not have gathered portions; i.e., the material is flat.

Thus, there still remains a need to provide a textile material having stretch and good recovery characteristics, yet which provides a flat surface, and has other desirable properties such as breathability, opacity, puncture resistance, etc.

Accordingly, it is an object of the present invention to provide a textile material, having a knit, woven or scrim web and having stretch and recovery characteristics in all directions, limited, of course, by the inherent stretch limits of the starting textile material, which textile material is flat, and a method of making such textile material.

It is a further object of the present invention to provide a textile material having a knit or woven web, and having stretch and recovery characteristics, but without the need to include elastomeric yarn in the knit or woven structure, and without the need for elastomeric films.

It is a still further object of the present invention to provide a textile material having a knit or woven web, and with good barrier properties including puncture resistance, insulation, filtration, opacity and liquid repellency.

It is a still further object of the present invention to provide wearing apparel including a knit, woven or scrim web, having stretch and recovery characteristics, which has thermal insulation properties and a dirt barrier, and has opacity, which wearing apparel has breathability.

SUMMARY OF THE INVENTION

The foregoing objects are achieved by the present invention, which is constituted by a laminate of (1) a first web of a knit, woven or scrim material, (2) a second web of nonwoven elastomeric material, and (3) a third web of a knit, woven or scrim material, discontinuously adhesively bonded together. The webs, when the nonwoven elastomeric web is in an unstretched state, are flat (that is, the first web is non-gathered or non-puckered). The laminate material has stretchability and recovery, breathability and barrier properties. The laminate material is free of an elastomeric film and the nonwoven elastomeric web provides recovery to the laminate. The nonwoven elastomeric web is preferably a web of meltblown elastomeric fibers. These laminates are well suited for infection control products, personal care products and garments.

DEFINITIONS

Figure 1:
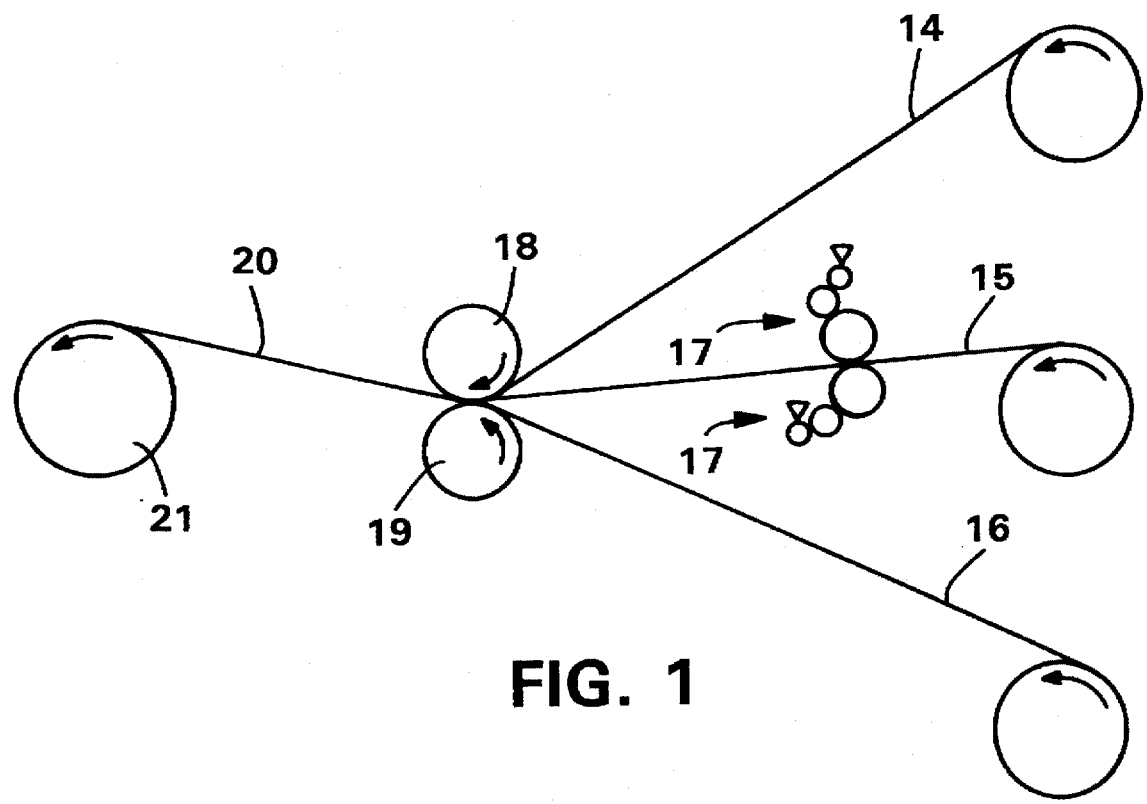
FIG. 1 schematically illustrates a first embodiment of forming a three-web laminate according to the present invention.

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carried web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber. For example, the diameter of a polypropylene fiber given in microns may be converted to denier by squaring, and multiplying the result by 0.00629, thus, a 15 micron polypropylene fiber has a denier of about 1.42 ($15^2 \cdot 0.00629 = 1.415$).

As used herein the term "spunbonded fibers" refers to small diameter fibers which are formed by extruding molten thermoplastic material as filaments from a plurality of fine, usually circular capillaries of a spinnerette with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Levy, and U.S. Pat. No. 3,542,615 to Dobo et al. Spunbond fibers are generally not tacky when they are deposited onto a collecting surface. Spunbond fibers are generally continuous and have diameters larger than 7 microns, more particularly, between about 10 and 20 microns.

As used herein the term "meltblown fibers" means fibers formed by extruding a molten thermoplastic material through a plurality of fine, usually circular, die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, incorporated by reference herein. Meltblown fibers are microfibers which may be continuous or discontinuous, are generally smaller than 10 microns in diameter, and are generally tacky when deposited onto a collecting surface.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configuration of the material. These configurations include, but are not limited to isotactic, syndiotactic and random symmetries.

As used herein, the term "machine direction" or MD means the length of a fabric in the direction in which it is produced. The term "cross machine direction" or CD means the width of fabric, i.e. a direction generally perpendicular to the MD.

As used herein, the term "stitchbonded" means, for example, the stitching of a material in accordance with U.S. Pat. No. 4,891,957 to Strack et al. or U.S. Pat. No. 4,631,933 to Carey, Jr., both incorporated by reference herein.

As used herein, "ultrasonic bonding" means a process performed, for example, by passing the fabric between a sonic horn and anvil roll as illustrated in U.S. Pat. No. 4,374,888 to Bornslaeger incorporated by reference herein.

As used herein "thermal point bonding" involves passing a fabric or web of fibers to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Other common patterns include a diamond pattern with repeating and slightly offset diamonds and a wire weave pattern looking as the name suggests, e.g. like a window screen. Typically, the percent bonding area varies from around 10% to around 30% of the area of the fabric laminate web. As is well known in the art, the spot bonding holds the laminate layers together as well as imparts integrity to each individual layer by bonding filaments and/or fibers within each layer, unless prebonded.

As used herein, the term "barrier fabric" means a fabric which is relatively impermeable to the transmission of liquids, i.e., a fabric which has blood strikethrough rate of 1.0 or less according to ASTM test method 22.

As used herein, the term "multi-use" means a material which may be laundered after use and reused at least 25 times without loss of structural integrity and without undue deterioration of its original properties.

As used herein, the term "garment" means any type of non-medically oriented apparel which may be worn. This includes industrial work wear and coveralls, undergarments, pants, shirts, jackets, gloves, socks, and the like.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets, and the like.

As used heroin, the term "personal care product" means diapers, training pants, absorbent underpants, adult incontinence products, and feminine hygiene products.

TEST METHODS

Hydrohead: A measure of the liquid barrier properties of a fabric is the hydrohead test. The hydrohead test determines the height of water (in centimeters) which the fabric will support before a predetermined amount of liquid passes through. A fabric with a higher hydrohead reading indicates it has a greater barrier to liquid penetration than a fabric with a lower hydrohead. The hydrohead test is performed according to Federal Test Standard No. 191A, Method 5514.

Frazier Porosity: A measure of the breathability of a fabric is the Frazier Porosity which is performed according to Federal Test Standard No. 191A, Method 5450. Frazier Porosity measures the air flow rate through a fabric in cubic feet of air per square foot of fabric per minute or CSM. Convert CSM to liters per square meter per minute (LSM) by multiplying by 304.8.

Resistance to Blood Penetration (RBP): The blood strikethrough or resistance to blood penetration of a fabric is a measure of the amount of blood which penetrates the fabric at a particular pressure. The blood strikethrough is performed by weighing a blotter placed next to the fabric before and after the test which consists of applying 1 pound per square inch gauge (psig) pressure to the side of the fabric away from the blotter, which side has blood thereon. The pressure is ramped up over approximately 10 seconds and removed when it reaches 1 psig. The difference in the weight of the blotter before and after the test in grams represents the amount of blood which has penetrated the fabric.

Bacterial Filtration Efficiency: The Bacterial Filtration Efficiency (BFE) is a measure of the ability of a fabric to stop the passage of bacteria through it. A higher BFE is generally more desired, especially in medical applications. BFE is measured in percent according to military specification MIL-M-36954C, 4.4.1.1.1 and 4.4.1.2.

Melt Flow Rate: The melt flow rate (MFR) is a measure of the viscosity of a polymer. The MFR is expressed as the weight of material which flows from a capillary of known dimensions under a specified load or shear rate for a measured period of time and is measured in grams/10 minutes at 220° C. according to, for example, ASTM test 1238, condition E.

Gelbo Lint test: The Gelbo lint test determines the relative number of particles released from a fabric when it is subjected to a continuous flexing and twisting movement. It is performed in accordance with INDA test method 160.1-92. A sample is placed in a flexing chamber. As the sample is flexed, air is withdrawn from the chamber at 1 cubic foot per minute for counting in a laser particle counter. The particle counter counts the particles by size from 0.3 to 10 microns using six channels to size the particles. The results can be reported as the total particles counted over 10 consecutive 30 second periods, the maximum concentration achieved in one of the ten counting periods or as an average of the ten counting periods. The test may be applied to both woven and nonwoven fabrics and indicates the lint generating potential of a material.

Dry Spore test: The Dry Spore Efficiency test evaluates the aerosol filtration efficiency of woven and nonwoven fabrics. An aerosol is drawn through a sample of material at a rate of 1 cfm and the results calculated after one minute. The aerosol is a mixture of *Bacillus subtilis* spores and talc.

Water Resistance Impact test: This test measures a fabric's resistance to the penetration of water under dynamic conditions and is performed according to AATCC standard test 42. A specified volume of water is allowed to spray down against the taut surface of a sample mounted at a 45° angle. The sample is backed by a blotter which is weighed before and after the test. Values are recorded as the number of grams of water penetrated through the fabric. Low numbers indicate good resistance to water penetration.

Flammability: This test is designed to measure the flame resistance of materials when they are in prolonged contact (20 seconds) with the source of ignition and is performed according to NFPA-702. The test also measures the rate of burning. A standardized flame is impinged for twenty seconds (or until ignition) on the lower edge of a specified sized sample mounted at a 45° angle. Results are recorded in seconds for the flame to spread 5 inches.

Alcohol: This test provides a rough index of the resistance of non-woven fabrics to penetration by alcohol and is particularly applicable when comparing various finishes on a given fabric. The effectiveness of alcohol-repellent finishes or treatments is determined by placing drops of specified percentages of isopropanol solutions on the surface of the sample and evaluating them after 5 minutes. Grading is by comparison with standard test rating photographs in accordance with INDA test method 80.9-74, revision '82.

DETAILED DESCRIPTION OF THE INVENTION

While the invention will be described in connection with specific and preferred embodiments, it will be understood that it is not intended to limit the invention to those embodiments. To the contrary, it is intended to cover all alterations, modifications and equivalents as may be included within the spirit and scope of the invention as defined by the appended claims.

The present invention contemplates a laminate material including two textile webs, e.g., nonelastic textile webs such as webs of knit material, or woven material, or scrim, having stretch and recovery characteristics, achieved by laminating the textile webs to a nonwoven elastomeric web, preferably, a web of elastomeric meltblown fibers. The laminated structure is flat, i.e., non-gathered by bonding the textile webs and nonwoven elastomeric web while the nonwoven elastomeric web is in a non-stretched state or so little stretched that, upon relaxation of the stretch, the textile material does not gather.

In stating that the webs are flat after lamination, we mean that the knit web, woven web or scrim web, as part of the lamination, is not gathered when the nonwoven elastomeric web is unstretched, after the bonding has been performed. The gathering of a web attached to a nonwoven elastomeric web is described in U.S. Pat. No. 4,720,415, the contents of which is incorporated herein by reference in their entirety. Thus, the present product differs substantially from that in U.S. Pat. No. 4,720,415.

According to the present invention, after bonding, the laminate material can be stretched as much as the knit, woven or scrim web can be stretched, with the nonwoven elastomeric web providing power recovery retraction force upon relaxation of the stretching of the laminate.

The laminate according to the present invention includes at least three webs, that is, three webs or more than three webs can be included. If three webs are used, the nonwoven elastomeric web can be an inner web of a sandwich of three webs, with the two outer webs, for example, being knit or woven or scrim webs. In this instance, the elastomeric web would be buried.

The nonwoven elastomeric web can be, for example, a spunbond web or a web of meltblown fibers. Desirably, the nonwoven elastomeric web is made of meltblown elastomeric fibers. Various known materials for forming meltblown elastomeric fibers, such a copolyetheresters; copolymers of ethylene and at least one vinyl monomer (e.g., ethylene vinyl acetate); A-B-A' block copolymers, wherein A and A' may be the same or different end blocks and each is a thermoplastic polymer end block or segment which contains a styrenic moiety such as polystyrene or polystyrene homologs, and B is an elastomeric polymer midblock or segment, segmented block copolymers, of two alternating segments, having the formula A-B; and a urethane polymer (e.g., polyurethane or a urethane copolymer), can be used in the present invention for the nonwoven elastomeric web.

Another suitable material is a polyester polyamide block copolymer having the general formula:

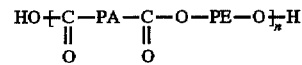

where n is a positive integer, PA represents a polyamide polymer segment and PE represents a polyether polymer segment. In particular, the polyether block amide copolymer has a melting point of from about 150° C. to about 170° C., as measured in accordance with ASTM D-789; a melt index of from about 6 grams per 10 minutes to about 25 grams per 10 minutes, as measured in accordance with ASTM D-1238, condition Q (235 C/1Kg load); a modulus of elasticity in flexure of from about 20 Mpa to about 200 Mpa, as measured in accordance with ASTM D-790; a tensile strength at break of from about 29 Mpa to about 33 Mpa as measured in accordance with ASTM D-638 and an ultimate elongation at break of from about 500 percent to about 700 percent as measured by ASTM D-638. A particular embodiment of the polyether block amide copolymer has a melting point of about 152° C. as measured in accordance with ASTM D-789; a melt index of about 7 grams per 10 minutes, as measured in accordance with ASTM D-1238, condition Q (235 C/1Kg load); a modulus of elasticity in flexure of about 29.50 Mpa, as measured in accordance with ASTM D-790; a tensile strength at break of about 29 Mpa, a measured in accordance with ASTM D-639; and an elongation at break of about 650 percent as measured in accordance with ASTM D-638. Such materials are available in various grades under the trade designation PEBAX® from Atochem Inc. Polymers Division (RILSAN®), of Glen Rock, N.J. Examples of the use of such polymers may be found in U.S. Pat. Nos. 4,724,184, 4,820,572 and 4,923,742 hereby incorporated by reference, to Killian et al.

Polymers composed of an elastomeric A-B-A-B tetrablock copolymer may also be used in the practice of this invention. Such polymers are discussed in U.S. Pat. No. 5,332,613 to Taylor et al. In such polymers, A is a thermoplastic polymer block and B is an isoprene monomer unit hydrogenated to substantially a poly(ethylene-propylene) monomer unit. An example of such a tetrablock copolymer is a styrene-poly(ethylene-propylene)-styrene-poly(ethylene-propylene) or SEPSEP elastomeric block copolymer available from the Shell Chemical Company of Houston, Tex. under the trade designation KRATON® G-1657. KRATON® block copolymers are available in several different formulations, a number of which are identified in U.S. Pat. Nos. 4,663,220 and 5,304,599, hereby incorporated by reference.

Other exemplary elastomeric materials which may be used include polyurethane elastomeric materials such as, for example, those available under the trademark ESTANE® from B. F. Goodrich & Co. or MORTHANE® from Morton Thiokol Corp., and polyester elastomeric materials such as, for example, those known as ARNITEL®, formerly available from Akzo Plastics of Arnhem, Holland and now available from DSM of Sittard, Holland, or those known as HYTREL® which are available from E. I. duPont de Nemours of Wilmington, Del.

These specific elastomeric materials are only illustrative, and not limiting. As to various elastomeric polymers which can be utilized, and, moreover, techniques for forming meltblown elastomeric fibers and nonwoven webs of these meltblown fibers, attention is directed to the specific meltblown materials described in U.S. Pat. No. 4,720,415 and U.S. Pat. No. 4,801,482; and U.S. Pat. No. 4,707,398 to Boggs and U.S. Pat. No. 4,741,949 to Morman, et al., the contents of each of which are incorporated herein by reference in their entirety. Various other elastomeric materials have been formed into meltblown elastomeric webs, and each falls within the contemplation of nonwoven elastomeric webs for the present invention.

The nonwoven elastomeric web, useful in the present invention, may be an unbonded or bonded material. Specifically, bonding of the nonwoven elastomeric material can enhance abrasion resistance. Such bonding can be achieved thermally, ultrasonically or by stitchbonding, for example, the nonwoven elastomeric web can be thermally point bonded.

Stretch recovery of the nonwoven elastomeric web is important in connection with the present invention, since the degree of recovery of the nonwoven elastomeric web will control the degree of recovery in the laminate. It is desirable that the nonwoven elastomeric web have omni-directional stretch and recovery, so as to deliver power recovery to whatever cloth is used. Thus, utilizing a nonwoven elastomeric web having omni-directional stretch and recovery, if the knit web of the laminate stretches in the machine direction (MD) then the laminate will have power recovery in the MD. If the knit web stretches in all directions, then the laminate will have power recovery in all directions.

A unique aspect of woven materials is that they stretch mostly in the bias, e.g., 45° off the machine direction (MD) or cross direction (CD). Using a nonwoven elastomeric web having omni-directional stretch and recovery, recovery is also provided in the bias direction.

The nonwoven elastomeric material is preferably a meltblown material. The fibers in the nonwoven elastomeric web illustratively range from 0.5 to 100 microns in diameter. Barrier properties in the finished laminate, e.g., increased opacity and/or insulation and/or dirt protection and/or liquid repellency, are enhanced by the use of finer fibers, in the 0.5–20 micron range.

The nonwoven elastomeric web may be a nonwoven elastomeric composite web. Illustratively, such composite web can be made of a mixture of two or more different fibers or a mixture of fibers and particulates. Such mixtures may be formed by adding fibers and/or particulates to the gas stream in which elastomeric meltblown fibers are carried so that an intimate entangled commingling of the elastomeric meltblown fibers and other materials occurs prior to collection of the meltblown fibers upon a collection device to form a coherent web of randomly dispersed meltblown fibers and other materials, such as disclosed in U.S. Pat. Nos. 4,100,324 and 4,803,117, the contents of each of which are incorporated herein by reference in their entirety. Useful materials which may be used in such nonwoven elastomeric composite webs include, for example, wood pulp fibers, staple length fibers from natural and synthetic sources, e.g., cotton, wool, asbestos, rayon, polyester, polyamide and the like, non-elastic meltblown fibers, and particulates such as, for example, activated carbon particulates or hydrocolloid (hydrogel) particulates commonly referred to as superabsorbents. Other types of nonwoven elastomeric composite webs may be used. For example, a hydraulically entangled nonwoven elastomeric composite web may be used such as disclosed in U.S. Pat. No. 4,879,170 to Radwanski, et al., and U.S. Pat. No. 4,939,016 to Radwanski, et al., the contents of which are incorporated herein by reference in their entirety.

The basis weight of the nonwoven elastomeric web may illustratively range from 0.20 to 6.0 osy (6.8 to 204 gsm). The basis weight is selected to provide desired laminate properties, including recovery and barrier properties. The more preferred basis weight for the nonwoven elastomeric web is from 0.3–3.0 osy (10.2 to 102 gsm).

As indicated previously, the nonwoven elastomeric web must be bonded to a knit web, or a woven web or scrim web, e.g., a nonelastic textile web, according to the present invention. The basis weight of the nonwoven nonelastomeric web may illustratively range from 0.20 to 6.0 osy. These knit webs, woven webs and scrim webs are known in the art; conventional webs, e.g. textile webs, such as a nonelastic textile web, can be used for the present invention. One particularly well suited type of material is, for example, nylon tricot fabric. Another fabric useful in the practice of this invention and having greater heat resistance than nylon is polyester knit fabric. Still more particularly, polyester knit fabric incorporating about 4 percent of carbon fibers for static reduction functions well in the practice of this invention. Continuous fiber material are preferred because they tend to produce less lint than other materials. These knit webs, woven webs and scrim webs can be formed as done conventionally.

Knitted fabrics generally have good stretch but relatively poor recovery. Since there is not much retraction force in the recovery, these knitted fabrics tend to lose their shape. However, a laminate according to the present invention, utilizing a nonwoven elastomeric web as discussed above, imparts recovery to the knit. In addition, particularly when utilizing an elastic meltblown for the nonwoven elastomeric web, the laminate material has unique z- direction impact and puncture resistance. Moreover, by using the nonwoven elastomeric web, the durability of the knit fabric is enhanced because the yarns are locked onto the elastomeric surface, e.g. elastomeric meltblown surface, and are not subject to the same level of yarn-to-yarn abrasion and stresses that the free knit structure would experience. In addition, knits backed or laminated with the nonwoven elastomeric web, e.g., an elastomeric meltblown web, become snag and run resistant because the yarns are immobilized on the elastomeric meltblown surface. Thus, the use of the nonwoven elastomeric web, particularly an elastomeric meltblown web, provides power recovery to prevent bagging and sagging and provides puncture resistance, particle filtration and liquid penetration resistance.

In addition to use of a knit web in combination with the nonwoven elastomeric web, according to the present invention, a woven or scrim web can be used. While woven and scrim webs have more dimensional stability than knits, especially in the machine and cross directions, power recovery is added to these materials to the extent that they stretch. Of particular interest is the bias stretch of, e.g., woven webs. The laminate of the present invention, using a nonwoven elastomeric web together with the woven web, provides a stretch recovery in the bias.

As with knits, the woven or laid scrim yarns are stabilized in their original structure, reducing yarn against yarn wearing, when the woven or scrim webs are laminated with the nonwoven elastomeric web according to the present invention. Stabilization of laid scrim webs is particularly useful, since the nonwoven scrims have poor dimensional stability to begin with. As with knit laminates, the z-directional puncture and impact resistance of the woven and scrim laminate is improved in the structure of the present invention, as compared with using a woven or scrim web by itself.

The nonwoven elastomeric web can be laminated to the web of knit, woven or scrim material using an adhesive. The most important factor is that the nonwoven elastomeric web be unstretched during lamination; or, alternatively, that any stretching of the nonwoven elastomeric web during bonding be sufficiently little such that when the nonwoven elastomeric web is relaxed to its unstretched state after bonding, there is no gathering or puckering of the, e.g., knit web.

Various means for bonding an elastomeric web to another web are disclosed, for example, in U.S. Pat. No. 4,720,415, the contents of which have previously been incorporated herein by reference in their entirety.

An adhesive may be pre-applied to the nonwoven elastomeric web and/or to the textile material; such adhesive may be heat activated to achieve lamination. Moreover, aqueous adhesives, or solvent-based additives, known in the art, may be used. An adhesive web can be interposed between textile material and the nonwoven elastomeric web, to provide the bonding.

An important factor for the adhesive is that it not interfere with the elasticity (e.g., recoverability) of the laminate. For this reason as well as to allow for air permeability, the adhesive must be discontinuous across the laminate. Therefore, application of the adhesive may be done in any manner known in the art as long as the adhesive is discontinuous. Such application means include rotogravure, dot gravure, flexographic, screen printing, meltblowing and ink jet printing.

The adhesive should be a crosslinking one and preferably a self-crosslinking and durable adhesive. Examples of such adhesives are described in U.S. patent application Ser. No. 07/995,468 (the '468 application), incorporated herein by reference, to Faass and assigned to the same assignee as this application, and may be in the form of a randomly scattered network of hot-melt adhesive filaments and/or fibers. The adhesive material may be a coating of any suitable conventional commercially available hot-melt adhesive such as, for example, hot melt adhesives which may be based on blends of polyolefins, adhesive resins, triblocks and waxes. The adhesive may typically be used in an amount between about 3 and 20 gsm or more particularly about 5 gsm.

A good coating for the practice of this invention is that of U.S. Pat. No. 5,149,741, hereby incorporated by reference, to Alper et al. and assigned to Findley Adhesives, Inc., of Wauwatosa, Wis. This coating is an adhesive which comprises about 15 to 40 parts of a styrene-isoprene-styrene block copolymer wherein the styrene content of the copolymer is 25 to 50 weight percent, about 40 to 70 parts of a compatible tackifying resin such as, for example, pentaerythritol esters, about 5 to 30 parts of a napthenic/paraffinic oil and 0.1 to 2 parts, by weight, of a phosphite antioxidant, hindered phenolic antioxidant and a stabilizer, where the adhesive has a melt viscosity of not greater than 6000 cP at 325° F.

Another example of an acceptable adhesive is that available from Advanced Resin Technology, Inc. of Manchester N.H. which is commercially available under the trade designation Bondstar®. Bondstar® RS-10178, for example, is a thermoplastic urethane adhesive which can be dispensed from conventional hotmelt equipment at temperatures up to about 400° F. (204° C.).

Illustratively, the bonding temperature can range from ambient temperature to 500° F. (482° C.)., the optimum temperature range being dependent on the webs and adhesive used. Using liquid adhesives could allow ambient bonding temperatures. Elevated bonding temperatures are needed to fuse the webs together using a thermoplastic adhesive web, with actual temperatures being dependent on the adhesive used and the melting temperatures of the involved webs.

FIG. 1 shows an embodiment of forming a three-web laminate according to the present invention, using an adhesive to provide the bonding for the lamination. In particular, reference characters 14–16 represent three webs to be laminated. Both of webs 14 and 16 are a textile web, while web 15 is the nonwoven elastomeric web. Reference character 17 represents an adhesive applicator, known in the art, which deposits an adhesive on both the top and bottom surfaces of the middle web 15. After the adhesive has been applied, web 15 is combined with webs 14 and 16 and passed between the bonding rolls 18 and 19, where bonding occurs. The adhesive used can be any suitable adhesive (liquid or thermoplastic), and can include aqueous or solvent based adhesives, as well as fusible coatings. The adhesive must be applied in a pattern, i.e. discontinuously.

As can be seen in the foregoing, any number of webs can be laminated, to form a laminate material according to the present invention, and either the textile web or the nonwoven elastomeric web, or both, can be exposed in the laminate product.

The laminates of this invention may also have topical treatments applied to them for more specialized functions. Such topical treatments and their methods of application are known in the art and include, for example, alcohol repellency treatments, anti-static treatments and the like, applied by spraying, dipping, etc. Fluorocarbon chemicals to enhance chemical repellency which may be, for example, any of those taught in U.S. Pat. No. 5,178,931, incorporated by reference herein, may be added to the fabric. One example of such a topical treatment is the application of Zelec® antistat (available from E. I. duPont, Wilmington, Del.). One preferred repellency treatment is produced by Synfin Industries of North Wales, Pa. as a proprietary treatment chemical. It is important that any treatments applied to the material be low in formaldehyde or other volatile materials since they will be in close contact with people during most applications. The laminate may also have conductive carbon fibers incorporated therein up to about 10 weight percent, as a static reducing measure to meet the requirements of static decay under Federal test 101C method 4046.

Fabrics for infection control applications, for example as a surgical gown, must have good liquid barrier properties in order to protect medical personnel from contact with the bodily fluids of the patient yet must be breathable in order for the wearer's perspiration to pass through the fabric so as to remain comfortable. The fabric must also be strong enough to perform the desired function in the appropriate environment yet be soft, stretchable and drapeable for the wearers comfort and to avoid restricting the wearer's range of motion.

It is also important in many applications of nonwovens, for example as garments, for the finished product to be as lightweight as possible yet still perform its desired function. A lighter garment performing the same function as a heavier garment would be more comfortable for the wearer and probably less expensive to manufacture since less raw material would be necessary for its production.

A lighter weight, soft fabric having high liquid barrier properties, high vapor transmission and good strength would be of great utility in a diverse range of applications.

Yet another useful property of the fabric of this invention is that it may be reused a number of times before being disposed of. Such reusability helps reduce disposal costs and environmental problems when the fabric is used as a surgical gown, for example, since materials contaminated with bodily fluids require specialized disposal procedures. By reducing the volume of material which must be disposed of relative to single use materials, surgical garments made from the fabric of this invention can contribute to a reduction in national health care expenditures.

When the laminate material according to the present invention is used as a garment, the apparel has thermal insulation and a dirt barrier to protect the wearer, while having breathability for comfort. Moreover, wearing apparel made of the laminate material of the present invention has opacity not otherwise achievable in lightweight knits.

Described below is a laminate according to the practice of this invention as well as two commercially available materials currently used for surgical gowns. Also set forth in Table 1 for each of these examples are various properties of the materials as measured according to the tests described above.

Example 1 - The ComPel® fabric used was part of a reusable or multi-use surgical gown and is made from tightly woven 100 percent polyester yarn. ComPel® fabric does not stretch and recover. The material tested had one layer and is available from the Standard Textile Company, Inc. of Cincinnati, Ohio, 45222. The ComPel® fabric tested had a coating of a repellent known as SYLGARD® from Dow-Corning. The manufacturer of ComPel® fabric claims it may be laundered and reused 100 times. The test results are on unlaundered material.

Example 2 - This material is a spunbond/meltblown/spunbond or SMS laminate available from the Kimberly-Clark Corporation of Neenah, Wis. as a disposable surgical gown material under the trade designation Evolution®III.

Evolution®III gown SMS fabric does not stretch and recover. The spunbond layers each have a basis weight of 0.545 osy (18.5 gsm) and the meltblown layer has a basis weight of 0.5 osy (17 gsm). The spunbond layers were made from polypropylene manufactured by the Exxon Chemical Company of Houston, Tex. under the trade designation PD 9355. These layers included minor amounts of pigments. The meltblown layer was also made from polypropylene from Exxon. This material was designated PD 3495G. This layer also included a minor amount of pigment. The fabric was thermally point bonded. The fabric was topically treated with a repellent chemical mixture including Dupont's 7700 repellent, Zelec® antistat, and hexanol.

Example 3 - This material is a laminate made according to the invention. It was comprised of a 1.5 osy (51 gsm) elastic meltblown web adhesively laminated to a continuous filament S850 nylon tricot knit with 18 loops per inch on both sides. The meltblown web is available under the trade designation Demique® fabric from the Kimberly-Clark Corporation and was comprised of elastomeric fibers made from DSM's Amitel® EM400 polymer. The adhesive used was Bondstar® RS-10178 urethane adhesive applied at an amount of about 5 gsm to each side of the elastic web using dot gravure printing. The laminate was treated with a repellent treatment from Synfin Industries of North Wales, Pa. This material has been laundered 50 times without delamination and hence is a multi-use or reusable material. The test results are on unlaundered materials.

TABLE 1

| EXAMPLE | 1 | 2 | 3 |
| --- | --- | --- | --- |
| TEST | | | |
| Blood Strikethrough (percent) | 0.21 | 1.0 | 0.75 |
| Hydrohead (centimeters) | >100 | 53 | 33 |
| Impact Penetration (grams) | <1.0 | <1.0 | <1.0 |
| Alcohol (visual rating 1–5) | 5 | 5 | 5 |
| BFE (percent) | 53 | 81 | 84 |
| Dry Spore (no. of part. per 1000) | — | 1.4 | 0.4 |
| Gelbo Lint (average of 10 30 sec. periods) | | | |
| 1 0 microns | 16 | 17 | 8 |
| 0.5 microns | 3700 | 3460 | 360 |
| Flammability (seconds) | Class I | Class I | Class I |
| Frazier Porosity (ft$^3$/min/ft$^2$) | 1 | 41 | 57 |

As seen in the foregoing examples, the laminate material of the present invention, including the nonwoven elastomeric web, provides improved properties as compared with commercially available materials. The laminate of this invention has a low blood strikethrough rate coupled with good hydrohead and very high breathability (Frazier Porosity). Particle filtration is also very good and lint generation an order of magnitude better than competitive fabrics at the smaller particle size, due at least in part, the inventors believe, to the fact that the fibers of the textile webs of this invention are preferably continuous fibers. This combination of properties makes this laminate an excellent candidate for protective yet breathable service requirements.

Accordingly, the objectives as discussed above are achieved by the present invention. Specifically, the present laminate textile materials have power recovery in all directions, although the degree of stretch is limited by the inherent stretch of the starting textile (knit or woven or scrim). Furthermore, the nonwoven elastomeric web component, particularly when such component is a web of meltblown elastomeric fibers, tightens the textile structure providing barrier properties and closing holes between the yarns of the, e.g., woven or knit web. These barrier properties include puncture resistance, insulation, filtration, opacity and liquid repellency. According to the present invention the elastomeric component may be buried in the textile structure (e.g., sandwiched between two webs of textile material such as knit material), whereby any undesirable feel of the elastomeric component may be avoided by a simple processing technique. In this regard, with conventional structures, using, e.g., Spandex yarns, an expensive core wrapping procedure is performed to overcome the poor coverage and tactile aesthetics of such yarn; such core wrapping procedure is unnecessary in the present invention. In addition, the present invention can provide a textile material having stretch and recovery characteristics, as well as other properties as discussed above, in a relatively simple and inexpensive procedure. Such procedure according to the invention is clearly preferable to the present technique for forming textile fabrics, incorporated spandex or rubber yarns into the knitted or woven structure; such spandex or rubber yarns are very difficult to process on knitting and weaving equipment due to their stretchiness and relatively high coefficient of friction, and relatively high costs of equipment set-up.

The inclusion of less than about 10 weight percent carbon fibers in fabrics of this invention ensures that the fabric will meet the current conductivity requirements of Federal test 101C method 4046.

Thus, the laminate material of the present invention, including the nonwoven elastomeric web and the textile webs, achieves the advantages of a textile web, while also achieving improved properties due to the nonwoven elastomeric web.

The laminate according to the present invention has improved breathability, as compared to textile laminates including an elastic film. The laminates according to the present invention can be produced in lower basis weights than wovens or knits that contain elastic yarns, due to the denier of elastic yarns. Furthermore, the laminates according to the present invention can be produced at a lower cost than wovens or knits that contain elastic yarns, due to the processing difficulties of elastic yarns. The laminate processing according to the present invention provides techniques for adding elasticity to available textiles, efficiently and at a relatively low cost.

Having thus described the invention in detail, it should be appreciated that various modifications and changes can be made in the present invention without departing from the spirit and scope of the following claims.

What is claimed is:

1. A laminate material having stretchability and recovery, breathability and barrier properties, comprising:
a nonwoven elastomeric web having at least one web of textile material discontinuously bonded to each side thereof with an adhesive,
wherein the laminate material is free of an elastomeric film, said elastomeric web is substantially flat when said laminate is unstretched, and the nonwoven elastomeric web provides recovery to the laminate.

2. A laminate material according to claim 1, wherein the laminate further comprises a topical repellent.

3. A laminate material according to claim 2, wherein said textiles are independently selected from the group consisting of knit, woven and scrim materials.

4. A laminate material according to claim 3, wherein said textile is a knit and the knit material is stretchable but has substantially no recovery, the web of meltblown elastomeric fibers providing recovery for the laminate material.

5. A laminate material according to claim 3, wherein said nonwoven elastomeric web is a web of meltblown fibers made of a material selected from the group consisting of elastic copolyetheresters; elastic urethane polymers; copolymers of ethylene and at least one vinyl monomer; polyamide polyether block copolymers, A-B block copolymers, A-B-A' block copolymers, A-B-A-B tetrablock copolymers and polyester elastomeric materials.

6. A laminate material according to claim 3 wherein said textiles comprise carbon fibers in an amount less than about 10 weight percent.

7. A laminate material according to claim 2 wherein said laminate is a multi-use material.

8. A laminate material according to claim 2, wherein the meltblown elastomeric fibers range from 0.5 to 20 microns in diameter.

9. A laminate material according to claim 2, wherein the nonwoven elastomeric web has a basis weight of 0.20 to 6.0 osy.

10. A laminate material according to claim 2, wherein said textile webs are made from continuous fibers.

11. A laminate material according to claim 2 wherein said laminate has a porosity of greater than 50 $ft^3/min/ft^2$ and a blood strikethrough of less than 1.0 percent.

12. A laminate material according to claim 1 wherein said adhesive is a self-crosslinking, durable adhesive.

13. The laminate of claim 1 which is present in an item selected from the group consisting of garments, infection control products and personal care products.

14. The laminate of claim 13 wherein said item is an infection control product and said infection control product is a surgical gown.

15. The laminate of claim 13 wherein said item is an infection control product and said infection control product is a face mask.

16. The laminate of claim 13 wherein said item is an infection control product and said infection control product is a sterilization wrap.

17. A multi-use, launderable, laminate material having stretchability and recovery, breathability and barrier properties, comprising:
a nonwoven meltblown polyester elastomeric web having at least one web of continuous filament polyester textile material also comprising about 4 weight percent of carbon fibers, discontinuously bonded to each side thereof with an adhesive to form a laminate,
wherein the laminate material is free of an elastomeric film, said elastomeric web is substantially flat when said laminate is unstretched, and the nonwoven meltblown polyester elastomeric web provides recovery to the laminate, and;
a topically applied low formaldehyde repellent material on said laminate.

18. A process for forming a laminate material having stretch and recovery, and having a flat surface when the laminate material is in the unstretched state, the laminate material being free of an elastomeric film, comprising the steps of:
providing a first web of a material selected from the group consisting of a knit material, a woven material and a scrim material, proximate to a nonwoven elastomeric web; and
joining the first web to the nonwoven elastomeric web through the agency of a discontinuously applied adhesive such that, when the joined first web and nonwoven elastomeric web are not stretched, the first web is substantially flat, the forming being performed without a elastomeric film such that the laminated material is free of an elastomeric film.

* * * * *

UNITED STATES PATENT AND TRADEMARK OFFICE
CERTIFICATION OF CORRECTION

PATENT NO. : 5,681,645

DATED : October 28, 1997

INVENTOR(S): Strack et al.

It is certified that errors appear in the above-identified patent and that said Letters Patent is hereby corrected as shown below:

Column 2, line 33, "carried" should read --carded--;
Column 2, line 50, "1.41($15^2$)0.00629=1.415)." should read --1.42($15^2$ x 0.00629=1.415).--;
Column 2, line 58, "et al.." should read --et al.,--;
Column 4, line 23, "heroin" should read --herein--;
Column 6, line 64, "a" (second occurrence) should read --as--;
Column 10, line 21, "6000 cP" should read --6000cP --;
Column 11, line 20, "wearers" should read --wearer's--;
Column 12, line 21, "Amitel®" should read --Arnitel® --.

Signed and Sealed this

Sixth Day of October, 1998

Attest:

BRUCE LEHMAN

Attesting Officer

Commissioner of Patents and Trademarks